United States Patent Office 3,266,864
Patented August 16, 1966

3,266,864
SULFITED OR AMINOMETHANE SULFONATED WATER SOLUBLE DICYANODIAMIDE-FORMALDEHYDE CONDENSATE WITH WASTE SULFITE LIQUORS OR SULFONATED AROMATIC-ALDEHYDE CONDENSATE IN LEATHER PLUMPING AND PRODUCT THEREOF
Bruno Zorn, Cologne-Deutz, Gustav Mauthe, Opladen, and Wolfhard Luck, Cologne-Stammheim, Germany, assignors to Farbenfabriken Bayer Aktiengesellschaft, Leverkusen, Germany, a German corporation
No Drawing. Filed Feb. 7, 1962, Ser. No. 171,595
Claims priority, application Germany, Feb. 17, 1961, F 33,225
7 Claims. (Cl. 8—94.21)

It is known to use water-soluble condensation products from dicyano-diamide, oxo compounds, especially formaldehyde, and water-soluble salts of sulphurous acid, for tanning hides and pelts or for after-tanning leathers which have already been tanned with other tanning agents.

The object of this invention mainly is to develop a new process for the plumping of leather employing water-soluble condensation products from dicyanodiamide, oxo compounds, especially formaldehyde, and water-soluble salts of sulphurous acid or aminoalkanesulfonic acids, characterised in that the condensation products are applied in form of a water-soluble mixture with water-soluble salts of known sulphonic acid group-containing condensation products of aromatic compounds and that the leathers show, at latest at the end of the treatment, a pH value of less than 7, preferably 3.5–5.5, to which purpose the leathers are treated, if necessary, before, during or after application of the mixture with an acid or with a compound reacting acid in aqueous solution.

Instead of the dicyanodiamide resins prepared by means of water-soluble salts of sulphurous acid, as said above there may be used also those in which, instead of the salts of sulphurous acid, a water-soluble salt of aminoethane-sulphonic acid or of its N-alkyl derivatives has been used. It is especially expedient to use the solution of an alkali metal salt of amino-methane-sulphonic acid, for example, the sodium salt or the crude reaction product of ammonia or ammonia salts, formaldehyde and sulfur dioxide, neutralized with sodium hydroxide. For the preparation of the dicyanodiamide resins according to this modification at least 0.3 mol, preferably 0.5–1 mol of aminomethane-sulfonic acid salts are advantageously used. With an increasing quantity of aminomethane-sulfonic acid salts the condensation time necessary for obtaining water-soluble dicyanodiamide resins decreases.

The term water-soluble means in the meaning of this invention shall say that the reaction mixture can be mixed with water in any proportion. The amount of formaldehyde used may vary within wide limits. It should be noted that with decreasing quantities of formaldehyde the formation of the water-soluble dicyanodiamide resins is made more difficult i.e. that with decreasing quantities of formaldehyde increasing quantities of salts of sulfurous acid or aminomethane-sulfonic acid salts have to be used. For example, by employing 0.5 mol of sodium bisulfite or of sodium aminomethane-sulfonate per 1 mol of dicyanodiamide in the presence of 2 mols of formaldehyde no water-soluble resins are obtained whilst with 5 or 6 mols of formaldehyde water-soluble resins are formed without difficulty. Advantageously the amount of formaldehyde used will therefore be more than 2 mols, preferably 2.5–5 mols, per mole of dicyanodiamide. It is not expedient to employ larger quantities of formaldehyde, since no technical improvements are achieved.

As water-soluble salts of sulfonic group-containing condensation products of aromatic compounds, there may be used condensation products, obtainable by known methods, from sulfonic acid group-containing compounds (e.g. sulfonated phenol, naphthol, naphthalene, p.p'-dihydroxydiphenylsulfone), sulfite waste liquor or from corresponding sulfalkylated (especially sulfomethylated) aromatic compounds. These may be replaced wholly or partly by sulfonic acid group-containing dyestuffs or fat substances or by fatty alcohol sulfonates. Mixtures of these materials may also be used.

The mixtures to be used according to the invention are water-soluble and can be precipitated from their solutions by addition of acids or compounds of acidic reaction such as aluminium, chromium or zirconyl salts. The larger the quantity of salts of sulfurous acid or aminomethane-sulfonic acids used for the production and/or the larger the amount of water-soluble salts of sulfonic acid group-containing condensation products admixed, the less precipitable are the solutions of the products towards the addition of acid compounds, also the lower is the pH value at which precipitation occurs. Furthermore, the precipitability of the mixtures is also dependent on the type of the sulfonic acid group-containing condensation products used in these mixtures in the form of their salts.

The ratio in which the water-soluble salts of sulfonic acid group-containing condensation products and the water-soluble dicyanodiamide condensation products are contained in the mixtures to be used according to the invention may vary within wide limits. It is advantageous to adjust the content of the mixtures of water-soluble salts of sulfonic acid group-containing condensation products and the pH value of the mixtures in such a way that the mixtures give a clear or opalescent aqueous solution and can be precipitated by dilute acids.

The mixtures to be employed according to the invention can be used for the plumping of leathers tanned by means of one or several known tanning agents such as vegetable, synthetic, mineral, resin or fat tanning agents or formaldehyde. They are particularly suitable for after-treatment of leather tanned with a mineral, especially chrome tanning agent.

The mixtures to be used according to the invention are applied in known manner to the moist leathers in form of their aqueous solutions or in solid state, preferably in a quantity of 1–10%, referred to the weight of the leather concerned. In contrast to the individual components, the mixtures have satisfactory effects as will be shown in the following examples. As compared with the use of the individual components, the mixtures to be used according to the invention yield leather with a tighter smoother, finer grain and with a more elastic soft handle and with good buffing and dressing properties. The plumping agents may advantageously be used before or after the treatment with the usual fat liquoring agents, or when non-ionic or anionic fat liquoring agents are employed also in combination with said fat liquoring agents. The agents to be used according to the invention may also be used to advantage in combination with customary mineral, synthetic or vegetable tanning or after-tanning agents.

The following examples are given for the purpose of illustrating the process of the present invention. Throughout the examples the parts and percentages are expressed on a weight basis.

Example 1

Two comparable pieces of chromium-tanned shaved and neutralized calf leather having in the cut a pH value of about 4.3–4.5 are treated as follows:

(A) The first piece is milled with 8% (referred to the shaved weight of the leather piece) of a condensation product from 1 mol of dicyanodiamide, 4.5 mols of formaldehyde and 0.25 mol of sodium bisulfite, and with 150% of water.

(B) The second piece is milled with 8% of the following mixture and likewise with 150% of water. The mixture consists of 75% of its solid content of the same dicyano-diamide condensation product used under (A) and of 25% of dinaphthyl-methane-disulfonic acid sodium salt.

Both leathers are milled for 1–3 hours, depending on the leather material used and the intensity of the milling process. After about ⅓ of the total running time, there is added, if necessary, to the liquor (B) a dilute acetic acid or boric acid solution in such a quantity that the liquor exhibits a final pH of 4.5–5 at the end of the after-treatment. Both leathers are fat-liquored under identical conditions and further processed in conventional manner. The leather obtained according to (B) is markedly plumper than that produced according to (A).

*Example 2*

The process is carried out as described in Example 1, but replacing the mixture indicated under (B) by a mixture consisting of 62.5% of its solid content of the dicyanodiamide condensation product indicated under (A) and 37.5% of dinaphthyl-methane-disulfonic acid sodium salt. The leather produced according to (B) is markedly plumper than that obtained according to (A).

*Example 3*

The process is carried out as described in Example 1, but the mixture indicated under (B) is replaced by a mixture consisting of 75% of its solid content of the dicyanodiamide condensation product indicated in Example 1 under (A) and 25% of a phenolic condensation product obtainable as described below. The leather produced according to (B) is plumper than that produced according to (A). The phenolic condensation product is obtained by careful neutralization of 200 parts by weight of a sulfonated phenol condensation product obtainable according to Example 1 of German patent specification No. 693,923, by stirring with 40 parts by weight of a 40% sodium hydroxide solution.

*Example 4*

A chromium-tanned neutralized cow hide, having in the cut a pH value of 4.3–4.5, is milled with 8% (referred to the shaved weight of the leather) of a mixture described below and 150% of water. After a milling time of 0.5–2 hours, depending on the leather material used, the mixture has been absorbed by the leather. The leather is fat-liquored and further processed in conventional manner.

The mixture employed consists of 75 parts by weight of an aqueous solution, containing approximately 50% solids of a product obtainable by condensing for 4 hours 1 mol of dicyano-diamide, 4.5 mols of formaldehyde in the form of a 37% solution, and 0.5 mol of sodium bisulfite at boiling temperature of the mixture, and of 25 parts by weight of sulfite waste liquor which has been delimed and concentrated to a solid content of about 50%.

The leather after-treated with this mixture is plumper than a comparable leather which has been after-treated with 8% of the same dicyanodiamide condensation product, but without the addition of sulfite waste liquor.

*Example 5*

3 comparable pieces of a chrome-tanned, shaved and neutralized calf leather which in the cut shows a pH value of about 4.5–4.7 were treated as follows:

(a) The first piece was milled at 50° C. for 2 hours with 150° of water, 10% of an aqueous solution containing 50% of a water-soluble condensation product from 1 mol of dicyano-diamide, 4.5 mols of 37% formaldehyde and 0.5 mol of sodium aminoethane-sulfonate.

(b) The second piece was milled at 50° C. for two hours in 150% of water with 10% of delimed neutral sulfite waste liquor containing 50% solids.

(c) The third piece was milled at 50° C. for two hours with 150% of water in the presence of a mixture of (1) 10% of an aqueous solution containing 50% of a water-soluble condensation product of 1 mol of dicyano-diamide, 4.5 mols of 37% formaldehyde and .5 mol of sodium aminoethane-sulfonate and (2) 10% delimed neutral sulfite waste liquor, the components (1) and (2) being used in a ratio of 10:6 parts by weight.

The evaluation of the leathers, after fat-liquoring, drying and stretching in the customary way, showed that the leather (c) which has been treated with the mixture according to the invention, has a distinctly better grain-resistance than the leather (b) and a fuller and rounder handle than the leathers (a) and (b).

*Example 6*

Similar to Example 5, 3 comparable pieces of calf leather were subjected to an after-treatment with the following agents:

(a) The first piece of leather was after-treated with 8% of an aqueous solution containing about 50% of a condensation product from 1 mol of dicyano-diamide, 3 mols of 37% formaldehyde and 0.75 mol of sodium aminomethane sulfonate, as specified in Example 1.

(b) The second piece was after-treated with 4% spray-dried sodium dinaphthylmethane disulfonate in the same manner as piece (a).

(c) The third piece of leather was treated in the same way as the aforesaid pieces with a 50% mixture of 92 parts of the resin product (a) and 8 parts of sodium dinaphthylmethane disulfonate.

The evaluation of the leathers, finished in the usual way, showed that the leather treated with the mixture (c) prepared according to the invention, had a finer grain than the leather (b) and a softer and rounder as well as fuller handle than the leathers (a) and (b).

*Example 7*

In a manner analogous to the preceding Examples 3 samples of calf leather were treated as follows:

(a) The first piece of leather was treated with 8% of an aqueous solution of a condensation product from 1 mol of dicyano-diamide, 5 mols of formaldehyde (37%) and 1.25 mols of sodium aminoethane sulfonate, containing 50% solids of said condensation product.

(b) The second piece of leather was treated with a solution containing 4% solids of a phenolic condensation product obtained according to German patent specification 1,053,517; Example 1.

(c) The third piece of leather was treated with a mixture of 73 parts of the resin mentioned under (a) (as 50% solution), mixed with 17 parts of the dry, neutral phenolic condensation product.

The evaluation of the leather showed again that the mixture (c), in accordance with the invention, had yielded a markedly better grain resistance than the products (a) and (b), and that (c) showed a softer handle than (a).

*Example 8*

In a manner analogous to that of the preceding Examples 3 comparable pieces of chrome-tanned cow hide were treated with the following products:

(a) The first piece was treated with 12% of a aqueous solution, containing 50% solids of a condensation product from 1 mol of dicyandiamide and 4 mol of 30% formaldehyde, and 1 mol of sodium aminomethane sulfonate.

(b) The second piece was after-treated with 12% of a neutral solution of a condensation product prepared according to Example 1 of the German patent specification 611,671, containing 50% solids.

(c) The third piece was treated with the mixture according to the invention consisting of the two components (a) and (b), 120 parts of dicyanodiamide resin solution and 58 parts of the neutral condensation product in the form of a 50% solution.

The evaluation of the finished leathers again showed that the leathers after-treated according to (c) had given a better grain resistance and a more pleasant, softer handle than those treated according to (a) and (b). Leathers with a smoother grain were obtained according to (c) than those obtained according to (b).

We claim:

1. In a process for plumping leather by treating with a condensation product selected from the group consisting of (A) water-soluble condensation product from dicyanodiamide, formaldehyde and a water-soluble salt of sulfurous acid and (B) water-soluble condensation product of dicyanodiamide, formaldehyde and a water-soluble salt of aminomethane sulfonic acid; the improvement consisting of contacting the leather with a liquor containing essentially the water-soluble condensation product in admixture with at least one component selected from the group consisting of
    (1) sulfite waste liquor and
    (2) water-soluble salt of condensation product of formaldehyde with at least one product selected from the class consisting of sulfonated phenol, sulfonated naphthol, sulfonated naphthalene, sulfonated p-p′-dihydroxydiphenyl sulfone, sulfomethylated phenol, sulfomethylated naphthol, sulfomethylated naphthalene, and sulfomethylated p-p′-dihydroxydiphenyl sulfone; said leather being maintained at a pH of less than 7 by the end of the treatment, precipitating the plumping agent in situ.

2. The process of claim 1 in which the water-soluble salt of a condensation product of an aromatic compound is the sodium salt of a dinaphthyl-methane-disulfonic acid, the pH of the leather being maintained by adding to said liquor a member selected from the group consisting of acetic and boric acid.

3. The process of claim 2 in which about 25–37.5% of the sodium salt of dinaphthyl-methane-disulfonic acid is employed, based on the weight of the solids content of the liquor.

4. The process of claim 1 in which the water-soluble salt of a condensation product of an aromatic compound is a sulfonated phenol treated with sodium hydroxide.

5. The process of claim 1 in which delimed sulfite waste liquor is present in the treating liquor together with the condensation product of dicyano-diamide, formaldehyde and sodium bisulfite.

6. The process of claim 1 wherein the (A) and (B) condensation products are formaldehyde-dicyanodiamide-aminomethane sulfonic acid resins, wherein the ratio of formaldehyde to dicyanodiamide is about 2.5–5:1 and about 1–10% of the active plumping material by weight of the leather is employed.

7. Leather prepared in accordance with claim 1.

References Cited by the Examiner

UNITED STATES PATENTS

| | | | |
|---|---|---|---|
| 2,205,355 | 6/1940 | Grimm | 8—94.21 |
| 2,377,867 | 6/1945 | D'Alelio | 260—69 |
| 2,412,855 | 12/1946 | Auten et al. | 260—69 |
| 2,567,238 | 9/1951 | Sellet et al. | 260—69 |
| 2,637,622 | 5/1953 | Dawson et al. | 8—94.21 |
| 2,944,046 | 7/1960 | Sellet | 8—94.2 |
| 3,013,908 | 12/1961 | Luck et al. | 117—142 |
| 3,023,073 | 2/1962 | Plapper et al. | 8—94.33 |
| 3,024,136 | 3/1962 | Sellet | 8—94.21 |
| 3,063,781 | 11/1962 | Fetscher | 8—94.24 |

OTHER REFERENCES

Chen, "Syntans and Newer Methods of Tanning," The Chemical Elements, South Lancaster, Mass., 1950, pp. 23–26.

NORMAN G. TORCHIN, *Primary Examiner.*

MORRIS O. WOLK, ABRAHAM H. WINKELSTEIN,
*Examiners.*

G. A. MENTIS, D. LEVY, *Assistant Examiners.*